C. H. BICALKY.
AIR PURIFYING AND COOLING APPARATUS.
APPLICATION FILED MAR. 25, 1911.
1,088,318.
Patented Feb. 24, 1914.
3 SHEETS—SHEET 1.
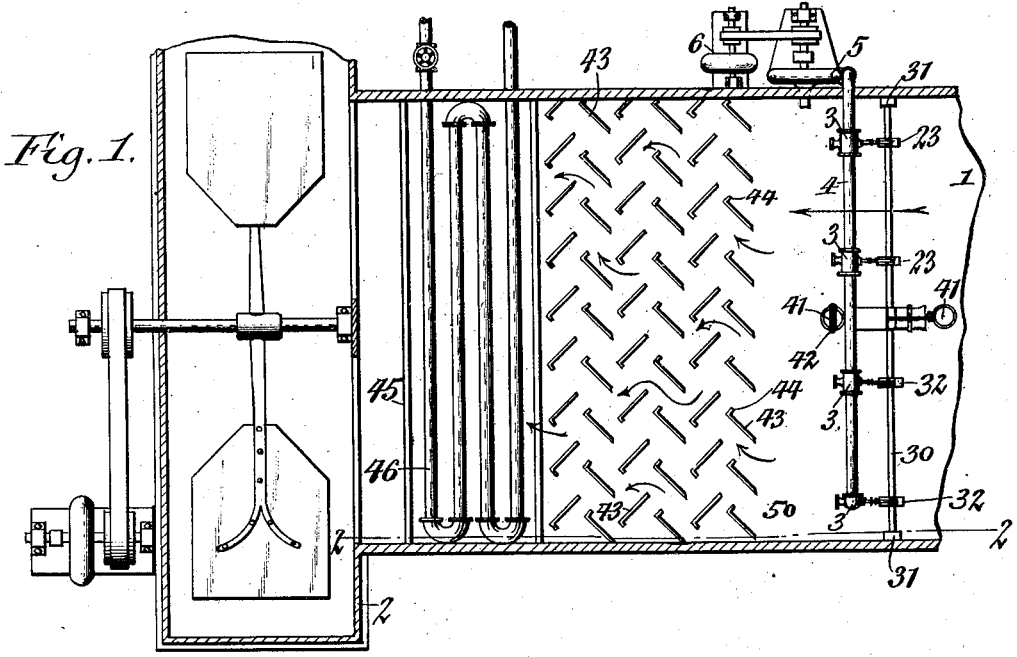
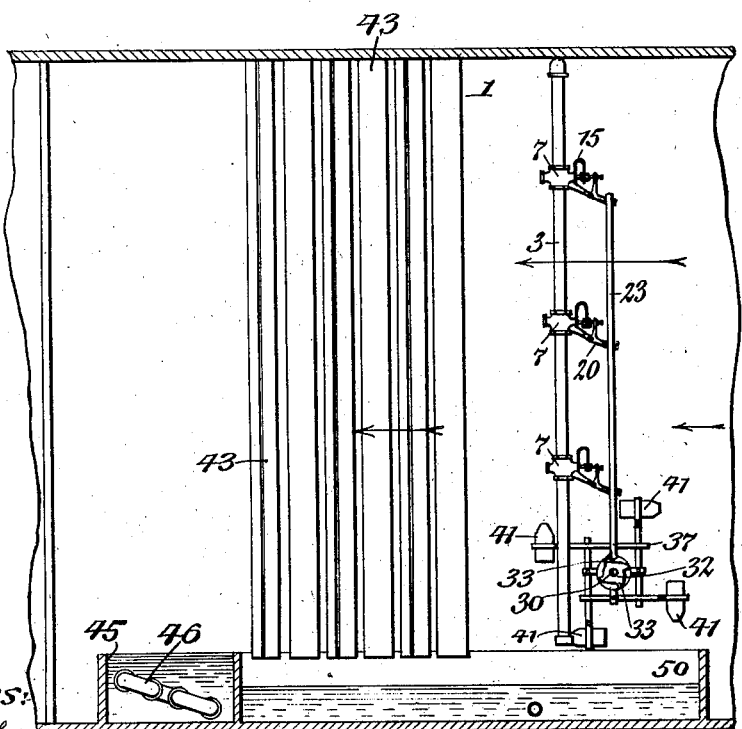
Witnesses:
Alfred Bakenhagen
Richard Sommer
Charles H. Bicalky, Inventor
by Geyer & Polk, Attorneys.

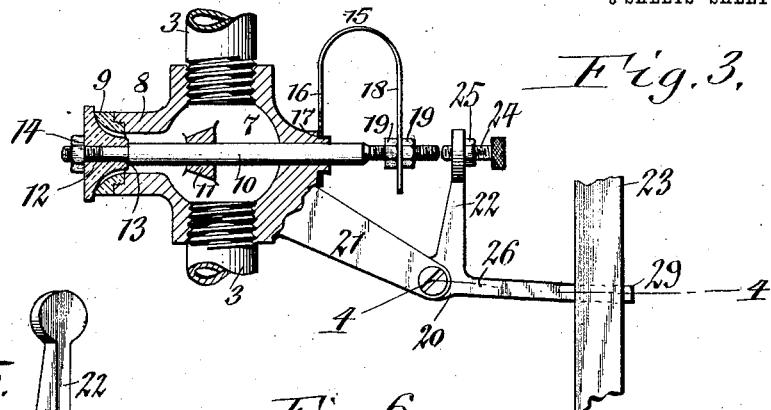

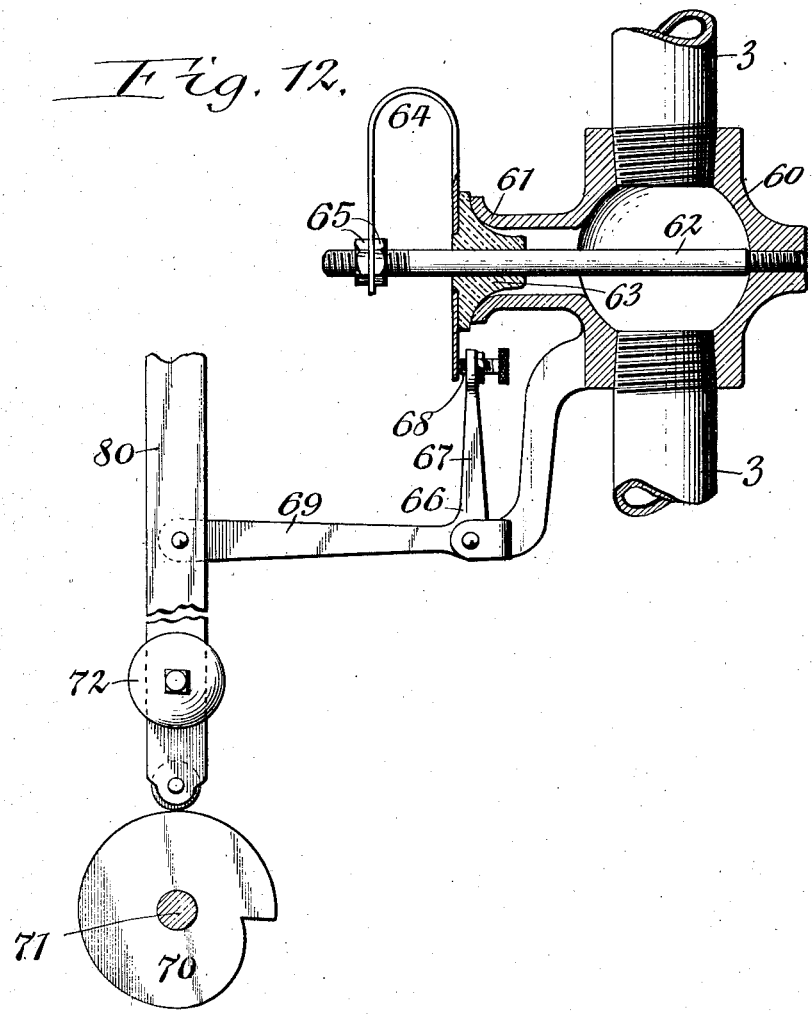

UNITED STATES PATENT OFFICE.

CHARLES H. BICALKY, OF BUFFALO, NEW YORK.

AIR PURIFYING AND COOLING APPARATUS.

1,088,318.  Specification of Letters Patent.  Patented Feb. 24, 1914.

Application filed March 25, 1911. Serial No. 616,886.

*To all whom it may concern:*

Be it known that I, CHARLES H. BICALKY, a citizen of the United States, residing at Buffalo, in the county of Erie and State of New York, have invented new and useful Improvements in Air Purifying and Cooling Apparatus, of which the following is a specification.

This invention relates to an apparatus for purifying and cooling air and has the object to provide an apparatus for this purpose which is reliable and effective in its operation and which can be manufactured and installed and also maintained at low cost and which is not liable to become inoperative by the accumulation of impurities of the water in the spraying devices.

In the accompanying drawings consisting of 3 sheets: Figure 1 is a horizontal section of an air purifying and cooling apparatus embodying my invention. Fig. 2 is a vertical longitudinal section of the same taken in line 2—2, Fig. 1. Fig. 3 is a fragmentary vertical section, on an enlarged scale, of one of the spraying devices and adjacent parts of the purifying and cooling apparatus. Fig. 4 is a horizontal section in line 4—4, Fig. 3. Fig. 5 is a detached perspective view of one of the elbow rock levers and coupling arm for operating the spreader of one of the spraying devices. Fig. 6 is a fragmentary perspective view of one of the shifting bars of the spreader shifting mechanism. Fig. 7 is a fragmentary section showing a form of sprayer nozzle differing from that shown in Fig. 3. Fig. 8 is a vertical longitudinal section, on an enlarged scale, of the water motor forming part of the means whereby the spraying devices are automatically and intermittently flushed. Fig. 9 is a horizontal section in line 9—9, Fig. 8. Fig. 10 is a detached sectional elevation of a trip cam differing slightly from that shown in Fig. 2. Fig. 11 is a detached perspective view of the cam shaft and the cams mounted thereon. Fig. 12 is a sectional elevation showing a modification of the spraying device and the means for automatically flushing the same.
Similar letters of reference indicate corresponding parts throughout the several views.

1 represents the conduit or chamber to which the air is drawn and which contains the mechanism for purifying, cooling and tempering the air as the same passes through this conduit. Although this conduit may be variously constructed and arranged it is preferably of rectangular form in cross section and so arranged that the air moves horizontally through the same from the inlet to the outlet of this conduit, as indicated by the arrows in Figs. 1 and 2. The air may be propelled through this conduit by any suitable means, the means for this purpose shown in Fig. 1, consisting of a fan having the eye of its casing 2 connected with the outlet of the air conduit while the outlet of the fan casing leads to the rooms or spaces which are to be supplied with the purified and tempered air.

Within the inlet part of the air chamber is arranged the mechanism whereby a fine spray of water vapor is formed in the path of the incoming air and any impurities contained in the same are intercepted and washed out. This spraying mechanism in its preferred form is constructed as follows: 3 represents a plurality of upright water delivery pipes which are arranged in a transverse row and preferably equidistant within the inlet end of the air conduit and connected at their upper ends by means of a horizontal manifold 4 leading to the outlet of a pump 5 which latter operates to draw water from a suitable source and supplies the same to the manifold 4 and delivery pipes 3. This pump may be driven by any suitable means, for instance, an electric motor 6, as shown in Fig. 1.

Each of the water delivery pipes is provided with one or more spraying devices whereby the water is delivered from these pipes in the form of an annular spray extending crosswise of the air conduit, three of such spraying devices being arranged on the upright pipe shown in Fig. 2, as an example, although this number may be varied.

The form of spraying device shown in Figs. 3, 4 and 5 is constructed as follows: 7 represents the hollow body of a spraying valve which is connected at its upper and lower sides with the sections of the piping forming one of the upright pipes 3 and which is provided on its front side with a horizontal forwardly projecting delivery nozzle 8. The outlet or mouth of this nozzle is provided with a circular tip, lining or mouth piece 9 of glass, porcelain or other vitreous material the bore of which preferably flares forwardly. This mouth piece may be secured to the nozzle in any suitable manner, for instance, by providing the opposing ends of the mouth piece and nozzle with complementary rabbeted surfaces, as shown in Fig. 3, and securing these rabbeted surfaces together by means of cement or other suitable means. 10 represents a horizontal valve spindle extending axially through the nozzle and through a guide opening in the rear wall of the valve body and also through a perforated cross bar or bridge piece 11 which is arranged within the body and serves to guide the front part of the valve spindle. At its front end the valve spindle is provided with a spreader, deflector or spraying head 12 which is preferably constructed in the form of a rearwardly tapering cone and arranged within the mouth piece of the nozzle. This spraying head may be formed of any suitable material although glass, porcelain, or other vitreous material is preferred. The spraying head is mounted on the front end of the spindle by providing the head with a central axial opening which receives the reduced front end of the valve spindle, the sprayer head being held against lengthwise movement by means of a shoulder 13 on the valve spindle and engaging with the rear side of the sprayer head and a screw nut 14 applied to the front end of the valve spindle and engaging with the front side of the sprayer head.

When the apparatus is not in operation, the sprayer head is yieldingly held in its rearmost position in which it engages with the mouth piece of the nozzle and closes the same. The means whereby the sprayer head is thus held preferably comprises a bow spring 15 having its front leg 16 provided with a perforation which is seated in an annular rabbet or shoulder 17 formed on the rear side of the valve body around the valve spindle while its rear leg 18 is provided with a perforation which receives the threaded rear end of the spindle and is adjustably secured thereto by means of clamping nuts 19, 19, arranged on the threaded rear end of the spindle and engaging with opposite sides of the rear leg of the bow spring.

The tension of the spring 15 is so adjusted that when the apparatus is not in operation it will draw the valve spindle backwardly until the sprayer head engages with the mouth of the nozzle but when water under pressure is supplied to the valve body, the outward pressure of the water against the sprayer head will force the same away from the mouth of the nozzle sufficiently to permit the water to escape in the form of a spray or vapor. The bore of the mouth of the nozzle is preferably curved and of convex form and the periphery of the sprayer head is of corresponding curved concave form, whereby the water upon passing between the mouth of the nozzle and the sprayer head is spread out into the form of an annular spray or vapor as it issues from the valve.

Owing to the sediment and other impurities usually contained in water the same has a wearing effect on the surface of the conduits through which the water passes and is turned from one course to another as is the case when the water passes from the nozzle laterally between the mouth and spreader head of the spraying valve. This wearing action of the water in the present invention is prevented by constructing the mouth of the nozzle and the sprayer head of glass or similar vitreous material, which material is not only capable of resisting the attrition of the water but is also kept constantly smooth and bright by the movement of the water instead of being scored and grooved as would be the case if these surfaces were made of softer material. The spray is therefore maintained constantly in a finely divided or vaporous condition best suited for thoroughly commingling with the air which is drawn through the same, thereby separating the impurities therefrom. By avoiding wear on the operative surfaces of the sprayer head and nozzle it also avoids disturbance of the adjustment of the same, thereby insuring a spray of uniform fineness at all times.

When installing the apparatus the tension of the spring 15 is adjusted on the valve spindle by means of the clamping nuts 19 so that this spring will offer the required resistance to the opening movement of the sprayer head for producing the desired spray in accordance with the pressure of the water supply.

The wearing tendency of the water as it issues from the nozzle is directed principally against the sprayer head and it will therefore be sufficient in many cases where the water is comparatively pure to construct only the sprayer head of glass or similar material while the mouth of the nozzle may be constructed integrally with the nozzle and of the same material, as shown in Fig. 7.

After the spraying valve has been in operation for a time the space between the mouth and sprayer head is liable to become clogged more or less by the accumulation of impurities which are contained in the water. These obstructions are readily removed by pushing the valve spindle forwardly and opening the sprayer head fully, thereby permitting a heavy stream of water to escape from the valve and flushing out any obstructions which may have gathered on the same, so that upon again releasing the spindle and permitting the head to resume its normal position a uniformly fine spray of annular form will be again delivered from the valve. In order to secure uniformity in the spraying action of the valve the sprayer head is moved into its fully opened position by automatic means at intervals, thereby insuring regularity in the flushing operation and obtaining the maximum purifying efficiency of the apparatus.

The preferred means for thus automatically actuating the valve spindle and head which are shown in the drawings are constructed as follows: 20 represents an elbow lever pivoted at its elbow on a bracket 21 projecting rearwardly from the valve casing and adapted to engage its upper arm 22 with the rear end of the valve stem. 23 represents an upright shifting rod which is moved up and down at intervals and which is connected with the rear arm of the elbow lever so that the movement of this bar is transmitted to the valve spindle and head. The shifting bar is preferably of channel shape in cross section and connected with the elbow levers of all of the spraying valves of one of the delivery pipes 3 so that the heads of these valves are opened and closed simultaneously. The preferred means of connecting the rear arm 26 of each elbow lever with the shifting bar consists in projecting its rear end through an upright slot 27 in the web of the shifting bar and confining the same therein by means of front and rear heads 28, 29 arranged on the rear part of the rock arm 26 and bearing against the front and rear sides of the shifting bar. The rear head 29 of the rock lever is oblong so that the same can be passed through the slot 27 of the shifting bar upon first turning the same into a position at right angles to its normal position. After passing this head of the rock lever through the slot 27 and turning the same into its normal position the heads 28, 29 bear against the bar on opposite sides of the slot, thereby connecting the rock lever with the shifting bar. After the rock lever is pivoted on the valve casing this lever is held against turning into an abnormal position, thereby preventing disengagement of the rock lever from the shifting bar. The coupling heads 28, 29 bear loosely against opposite sides of the shifting bar so as to form a pivotal connection between these parts and cause the rock lever to turn upon raising and lowering the shifting bar.

The weight of the shifting bar and the parts connected therewith normally tends to hold the same in its lowered position in which the elbow levers are shifted into a position in which the upper arms thereof clear the rear end of the valve spindles and do not interfere with the operation of the sprayer heads and the tension springs. For the purpose of permitting each elbow lever to be adjusted accurately with reference to its valve spindle and cause the several sprayers to work uniformly the upper arm of each elbow lever is provided with an adjustable screw 24 which is adapted to engage with the rear end of the adjacent valve spindle and which is held in position after adjustment by a jam nut 25, as shown in Fig. 3.

At intervals, the shifting bar is raised and then permitted to drop for the purpose of momentarily opening all of the sprayer heads of one set of spraying valves and flushing the same. This raising of the shifting bar is preferably effected by a hydraulic motor which receives its water supply from the spent water of the various sprays dropping into the lower part of the air conduit. In its preferred form this motor is constructed as follows: 30 represents a horizontal motor or cam shaft extending preferably transversely across the lower part of the air conduit and journaled in suitable bearings 31. This shaft is provided below each of the shifting bars with a rotary cam wheel 32 which may be provided either with a plurality of cam teeth or tappets 33, as shown in Fig. 2, or with a single tooth or tappet 34, as shown in Fig. 10. Each of these cam teeth has an inclined or curved front side and an abrupt or radial rear side. Upon turning the shaft together with the cams mounted thereon each cam tooth upon engaging its inclined front side with the lower end of a shifting bar raises the latter and as the cam tooth passes the lower end of the shifting bar the latter drops by gravity along the abrupt face of the respective cam tooth. By this means the spreading head of each valve is momentarily opened and then quickly returned to its nearly closed position while the apparatus is in operation. On the central part of the motor shaft is arranged the hub 35 of a water wheel which is provided on its periphery with a plurality of radial supporting lugs 36, four of such lugs being shown in Figs. 2 and 8, although a different number may be employed, if desired. Slidable tangentially in each one of these supporting lugs is a supporting bar or arm 37 which is adjustably secured in said lug by means of a set screw 38. At its outer end each of the supporting bars is bent to form a split ring 39 the ends of which are connected by a clamping bolt 40. Within each split ring is adjustably clamped a bucket 41 which is arranged tangentially with reference to the axis of the motor shaft. This bucket is provided with a cylindrical body while its mouth 42 is elongated and contractible so as to vary the size of the mouth and permit of varying the time required for filling the bucket to suit the requirements. These buckets are preferably constructed in this manner from a piece of piping which is plugged at one end to form the bottom of the bucket while its other end is squeezed together to form a narrow elongated mouth or inlet for the bucket. The relative position of these buckets and the spraying nozzle is such that when each bucket is arranged in its upright position with its mouth facing upwardly this mouth will be substantially in vertical alinement with and below the sheet of spray produced by the several spray nozzles, whereby a portion of the water issuing from the spray nozzles and dropping into the lower part of the air conduit is caught by that bucket of the water wheel which is in its operative position. When sufficient water has accumulated in the operative bucket the same is turned forwardly, in the direction of the arrow Fig. 8, thereby causing the filled bucket to move to the lower part of the wheel where the contents of the same are discharged and the next following empty bucket of the wheel is moved into a position in which it will catch part of the spray which descends from the several sprayers. In this manner a slow intermittent rotary movement of the water wheel is effected and the necessary motion is obtained for operating the sprayer heads of the valves for flushing the same. By adjusting the supporting arms 37 tangentially relatively to the motor shaft, these buckets can be placed in a position in which the best results are obtained in accordance with the position and condition of the spray which is delivered by the valves and the frequency with which it is desired to flush the valve.

The several cams 32 are set in different positions relatively to each other on the cam shaft, as shown in Fig. 11, so that the different sets of spraying devices will not be flushed at the same time but at different times, thereby enabling a smaller water motor to be used and also causing the greater number of spraying devices to remain in an operative condition while the smaller number is being flushed, whereby the air is always subjected to a washing or cooling action of a water spray instead of arresting this action altogether for a short time as would be the case if all the valves were flushed simultaneously.

The water discharged successively by the buckets of the water wheel and the spray of the valves is collected by means of a catch basin or vat 50 in the lower part of the air conduit and the water is preferably withdrawn from this place by the pump 5 so that this water is kept constantly in circulation and used repeatedly until it becomes foul when the same is drawn off into a drain or waste and replenished by a fresh batch of water.

As the incoming air passes through the screen of water produced by the sprays of the several valves it becomes laden with an excess of moisture. In order to remove this excess moisture together with the impurities contained in the same an eliminating or separating device is provided which preferably consists of a plurality of upright baffle plates 43 which are arranged in staggered fashion in front of the spray valves at an angle to the path of the air. Each plate is provided at its front end with a flange 44 projecting toward the face of the separating plate so as to form a gutter or conductor which catches the water or moisture which is separated from the air as the latter strikes the plate and conducts the same to the lower end of this plate. The basin 42 preferably extends forwardly underneath the several separating plates so as to catch the water dripping from the lower ends of the latter.

At certain times of the year when the air is exceedingly dry it is desirable to humidify the same and for this purpose means are provided whereby the purified air after passing the separating plates is charged with pure water vapor. This is preferably effected by arranging a water tank 45 in the lower part of the air conduit in front of the separating plates and arranging a heating coil 46 within the tank, as shown in Figs. 1 and 2. Whenever it is desired to humidify the air a heating medium, such as hot water or steam, is circulated through the coil 46 which causes the water in the tank 45 to become heated and give off a vapor which rises and becomes mixed with the purified air as it passes from the separating plates to the fan. As the air passes through the screen of water spray the impurities are removed therefrom and the air is cooled as well which is particularly desirable in warm summer weather.

The modification of my improved spraying device and the mechanism for automatically flushing the same which is shown in Fig. 12 are constructed as follows: 60 represents a valve body connected with a water supply and provided with a delivery nozzle 61. Extending lengthwise through this nozzle is a horizontal stationary guide rod 62 which is secured at its front end to the front side of the body by a screw joint, as shown, or by any other suitable means. On the rear end of the guide rod a sprayer head 63 is slidably mounted so as to be movable toward and from the mouth of the nozzle. This sprayer head is yieldingly moved toward the mouth of the nozzle by a bow spring 64 having one end normally fixed and adjustably secured to the guide rod by means of screw nuts 65 arranged on the guide rod and engaging with opposite sides of the fixed leg of the spring. The opposite or free end of the spring bears against the outer side of the sprayer head so as to close the same when the water pressure is turned off but permit the same to open slightly and distribute the water in the form of a fine annular spray when the water is turned on. The sprayer head is moved wide open for flushing the same and the nozzle by means of an elbow rock lever pivoted on a bracket 66 on the body and provided on its upper arm 67 with a bearing screw 68 which is adapted to engage the movable leg of the spring while its lower arm 69 is pivotally connected with a vertically movable shifting bar 80. The latter is normally held in an elevated position by the high part of a rotary cam 70 mounted on a shaft 71 and engaging with the lower end of the shifting bar. When the cam presents its low face or part to the shifting bar the latter drops by its weight aided by a supplemental weight 72 secured to the bar, thereby causing the lever to move the spring away from the head and permitting the latter to be opened wide for flushing the valve. When the high part of the cam engages the shifting bar the same is raised and the spring is permitted to move the head toward the nozzle for producing the spray.

I claim as my invention:

1. A sprayer for air purifiers or coolers comprising a valve body having an outlet nozzle, a sprayer head movable toward and from said nozzle, and means for shifting said head comprising a rock lever operatively related to said head, a shifting bar connected with said lever and a water wheel operated by the water from said nozzle and operatively associated with said bar.

2. A sprayer for air purifiers or coolers comprising a valve body having an outlet nozzle, a sprayer head movable toward and from said nozzle, and means for shifting said head comprising a shifting bar provided with a slot and a rock lever having one of its arms arranged to operate said head and provided on its other arm with heads which bear against opposite sides of said bar in one position of said arm and one of which is capable of passing through said slot in another position of said arm.

3. A sprayer for air purifiers or coolers comprising a valve body having an outlet nozzle, a sprayer head movable toward and from said nozzle, and means for shifting said head comprising a spindle carrying said head, a rock lever, an adjusting screw mounted on the lever and adapted to engage said spindle and a water wheel operated by the water from said nozzle and operatively associated with said lever.

4. A sprayer for air purifiers and coolers comprising a valve body having an outlet nozzle, a movable sprayer head controlling said nozzle, and means for shifting said head relatively to said nozzle comprising a rotatable water wheel having a plurality of buckets which are adapted to be filled with water delivered by said nozzle and emptied successively.

5. A sprayer for air purifiers and coolers comprising a valve body having an outlet nozzle, a movable sprayer head controlling said nozzle, and means for shifting said head relatively to said nozzle comprising a rotatable water wheel having a plurality of buckets which are adapted to be filled with water and emptied successively, each of said buckets having a narrow elongated inlet.

6. A sprayer for air purifiers and coolers comprising a valve body having an outlet nozzle, a movable sprayer head controlling said nozzle and means for shifting said head relatively to said nozzle comprising a rotatable water wheel having a plurality of buckets which are adapted to be filled with water and emptied successively, a plurality of tangential supporting bars each provided with a split ring which receives one of said buckets, and a hub provided with a plurality of lugs in each of which one of said bars is adjustably secured.

7. A sprayer for air purifiers and coolers comprising a valve body having an outlet nozzle, a movable sprayer head controlling said nozzle and means for shifting said head relatively to said nozzle comprising a rotatable water wheel having a plurality of buckets which are adapted to be filled with water delivered by said nozzle and emptied successively, a cam wheel rotatable with said water wheel, and a shifting bar engaging with said cam wheel and operatively related to said sprayer head.

8. A sprayer for air purifiers and coolers comprising a valve body having an outlet nozzle, a movable sprayer head controlling said nozzle and means for shifting said head relatively to said nozzle comprising a rotatable water wheel having a plurality of buckets which are adapted to be filled with water delivered by said nozzle and emptied successively, a cam wheel rotatable with said water wheel, and intermediate mechanism for transmitting the action of said cam to said head.

9. An air purifier and cooler comprising a plurality of spraying devices, and means for flushing the members of said spraying devices at different times comprising a water wheel which is turned by the water delivered by said spraying devices.

10. An air purifier and cooler comprising a plurality of spraying devices, and means for flushing the members of said spraying devices at different times comprising a plurality of shifting bars operatively connected with different spraying devices, a cam shaft, a plurality of cams mounted on said shaft and arranged to shift said bars at different periods and a water wheel which actuates said cams and which is operated by water delivered by said spraying devices.

Witness my hand this 24th day of March, 1911.

CHARLES H. BICALKY.

Witnesses:
 THEO. L. POPP,
 E. M. GRAHAM.